United States Patent [19]

Schmidt

[11] Patent Number: 4,465,221

[45] Date of Patent: Aug. 14, 1984

[54] METHOD OF SUSTAINING METALLIC GOLF CLUB HEAD SOLE PLATE PROFILE BY CONFINED BRAZING OR WELDING

[76] Inventor: Glenn H. Schmidt, 1857 Los Encinos, Glendale, Calif. 91208

[21] Appl. No.: 425,723

[22] Filed: Sep. 28, 1982

[51] Int. Cl.³ .................. B23K 31/10; B23K 1/18
[52] U.S. Cl. .................................... 228/125; 228/162; 228/216; 273/173
[58] Field of Search ............... 228/125, 160, 162, 215, 228/216; 219/73, 126; 273/173, 174

[56] References Cited

U.S. PATENT DOCUMENTS

| | | | |
|---|---|---|---|
| 2,262,212 | 11/1941 | Stone | 228/125 |
| 2,809,838 | 10/1957 | Oquist | 273/173 |
| 4,208,563 | 1/1980 | Frantzreb, Sr. et al. | 219/73 |
| 4,214,754 | 7/1980 | Zebelean | 273/167 F |

FOREIGN PATENT DOCUMENTS 702735   1/1965   Canada ........................... 273/173

Primary Examiner—Nicholas P. Godici
Assistant Examiner—Thomas S. Mieczkowski
Attorney, Agent, or Firm—William W. Haefliger

[57] ABSTRACT

A method of attaching a sole plate to a hollow metal golf club head by providing a dam integral with the head whereby a metallic melt is sustained around the periphery of the sole plate. The dam is later removed so that the sole plate and golf club head are the same height.

8 Claims, 7 Drawing Figures

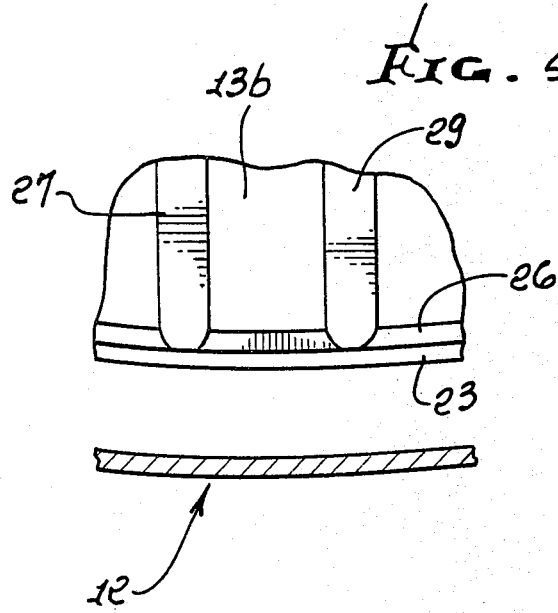
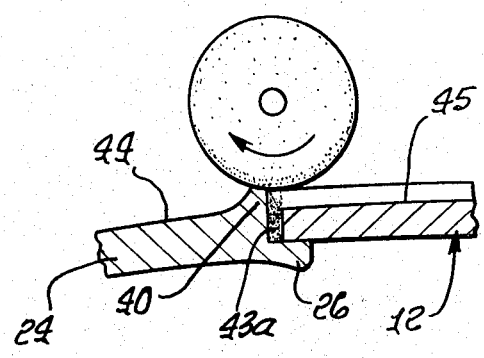
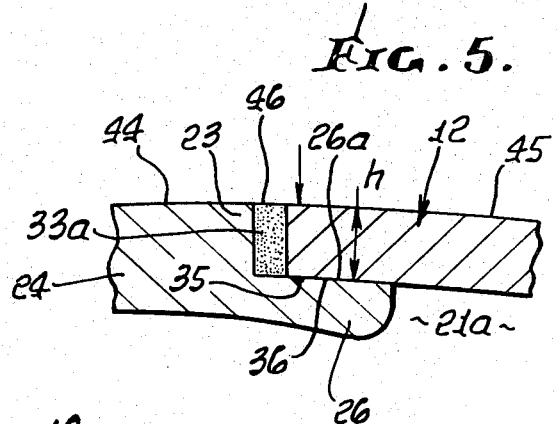
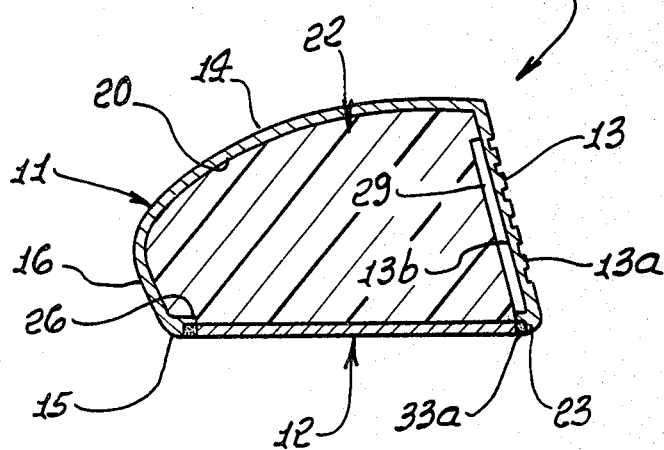

METHOD OF SUSTAINING METALLIC GOLF CLUB HEAD SOLE PLATE PROFILE BY CONFINED BRAZING OR WELDING

BACKGROUND OF THE INVENTION

This invention relates generally to fabrication of metallic, hollow golf club heads (woods). More particularly, it concerns the support of metallic sole plates on head shells as during their interconnection.

During fabrication of golf club metal heads (woods) of hollow configuration, an opening is formed in the bottom wall of the head. That opening is typically covered or filled by brazing attachment of a sole plate to the rim bounding the opening. The openig results from the lost wax process of fabrication, wherein metal core parts are removed from the wax shell via the precursor opening in that shell.

It has been proposed to support the metal sole plate in the opening formed by the metal shell, as by employing tabs on the sole plate, whereby the weld connection can then be accomplished; however, such tabs allow leakage of braze or weld melt into the interior of the hollow metal head. In addition, the melt tends to flow outwardly of the opening so that a smooth line of demarcation between the sole plate and head is difficult to establish upon grinding, and undesirable grinding of sole plate and head metal frequently occurs. Also, such tabs formed on the precursor wax "sole plate" are disadvantageously subject to unwanted break-off due to their weak support on that plate.

SUMMARY OF THE INVENTION

It is a major object of the invention to provide method and product overcoming the above problems and disadvantages. Basically, the method of the invention includes:

(a) providing a dam on the head extending about said opening and to project outwardly to greater extent than the sole plate when the sole plate is supported on ledge surfaces, (b) joining the sole plate to the head by producing a metallic melt at the sole plate periphery, and employing the dam to confine the melt at the side of the dam proximate the sole plate, and (c) thereafter removing the dam.

As will appear, a looping ledge is typically formed or spaced about the opening inwardly of the rim to obstruct leakage of weld metal into the hollow interior of the shell.

In its apparatus or product aspects, the invention comprises:

(a) ledge structure integral with the shell and adjacent a rim formed by said opening so that the ledge structure is between the shell hollow and the rim, to support the sole plate, and (b) a dam integral with the shell and projecting outwardly of the rim to confine a braze or weld melt proximate said rim.

These and other objects and advantages of the invention, as well as the details of an illustrative embodiment, will be more fully understood from the following specification and drawings, in which:

DRAWING DESCRIPTION

FIG. 2a is a view like FIG. 2 showing the dam being removed, after welding connection of the sole plate to the shell;

FIG. 4 is an enlarged, fragmentary, and exploded frontal view of a shell ledge and sole plate;

FIG. 5 is an enlarged fragmentary elevation; and

FIG. 6 is a cross section taken in elevation through a completed head incorporating the invention.

DETAILED DESCRIPTION

Figure 1:
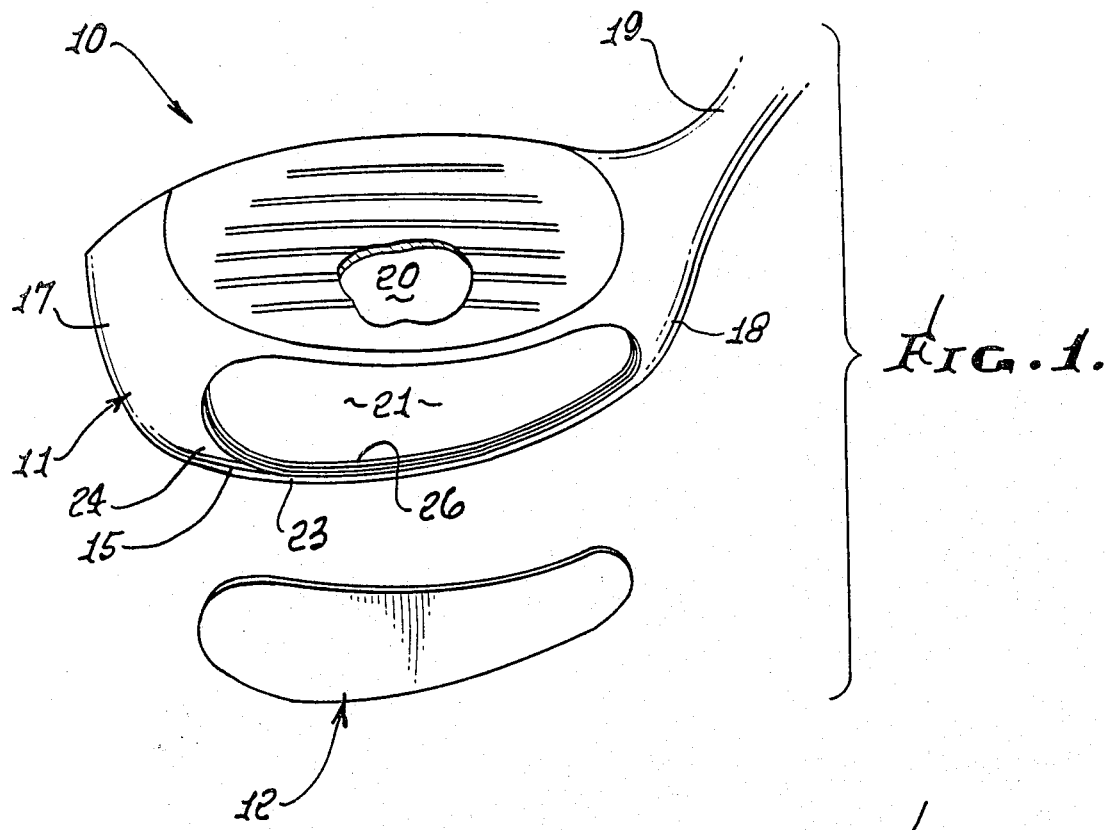
FIG. 1 is a perspective, exploded view of the front face and underside of a metal golf club head, with a thin sole plate separated from the head shell.

In the drawings, the golf club head 10 comprises a thin metallic shell 11 and a thin metallic sole plate 12. The shell typically comprises steel, and the sole plate comprises brass or other metal. The shell includes a front wall 13 having a front face 13a adapted to strike a golf ball, thin top and bottom walls 14 and 15, and rear wall 16. Also, the head includes a toe portion 17, and a heel portion 18. A hosel appears at 19. The shell defines a hollow interior 20, and prior to attachment of the sole plate to the shell, the interior opens at 21 to the exterior. One reason for that opening is to allow for removal of core structure during the fabrication of the hollow shell, as by the lost wax process. The hollow interior is ultimately filled with foamed plastic material (which may consist of polyurethane) as seen at 22 in FIG. 6.

Figure 2:
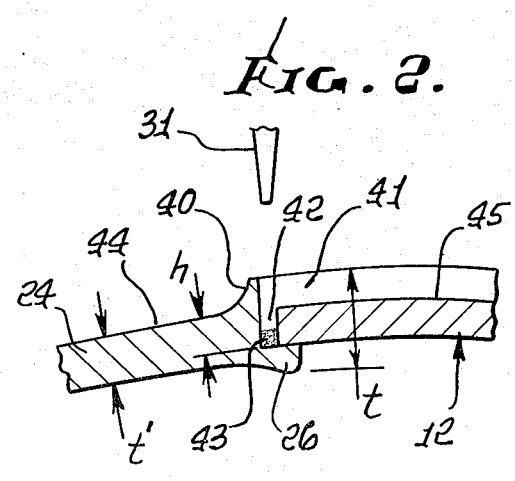
FIG. 2 is an enlarged fragmentary view showing a portion of a sole plate surrounded by a dam and supported on a ledge integral with the shell.
Figure 3:
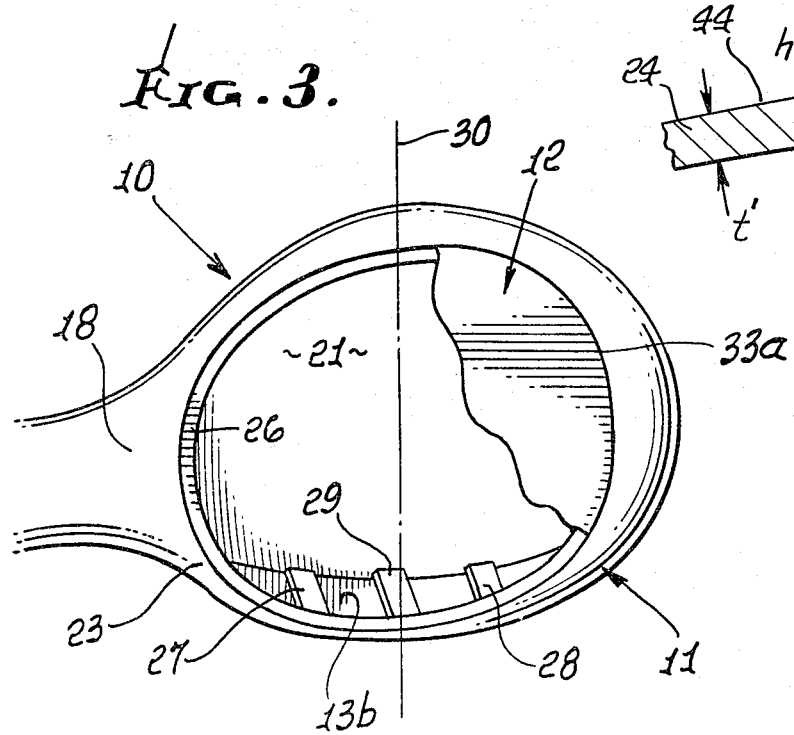
FIG. 3 is a bottom plan view of the FIG. 1 head, with the sole plate partly broken away.

One aspect of importance concerns forming continuous or looping ledge structure integrally with the shell and adjacent a rim bounding the opening 21, by locating the ledge structure in the hollow of the shell, in offset relation to the rim. FIGS. 1, 2 and 2a show loop shaped rim 23 formed by shell bottom wall lip 24 bounding opening 21.

The looping ledge structure is typically formed to define a continuous ledge 26 spaced about opening 21, inwardly of rim 23. Of particular advantage from a sole plate supporting and ledge weight distribution standpoint, is the formation of the ledge to have the shape as shown in FIGS. 1-4. Thus, the shell next to the rim 23 is thickened, to merge with the ledge. Also the ledge is curved to match the edge curvature of the sole plate. Further, the ledge merges with the lower ends of ribs 27 and 28 which are formed integrally with the inner side 13b of wall 13 to strengthen that wall for resisting golf ball impact. A third rib appears at 29.

In addition, the ledge is formed to resist breakage, as during the wax precursor stage wherein metallic core parts are removed through opening 21 and can engage the wax ledge (precursor to ledge 26). Ledge 26 is likewise preferably located to extend at approximately equal distances from and at opposite sides of plane 30.

FIG. 2 also shows the provision of a dam 40 on and integral with the head, and extending (looping) about the opening 21, but projecting outwardly therefrom to greater extent than the sole plate. As a result, a confined looping zone 41 is defined, just outwardly of (above) the gap 42 to be filled with the braze (or weld) melt, a part of which is indicated at 43. FIG. 2 also shows braze equipment 31 positioned to braze connect the sole plate to the shell rim and ledge. FIG. 2a shows the solidified braze 43a filling space 42 and extending at the inner side of the dam 40 where it was confined in melted condition, to provide a smooth, clear and looping line 46 of demarcation therebetween (see FIG. 5, also). Ledge 26 has its upper surface spaced at distance "h" from the level of the shell surface 44 outwardly of the dam 40, so that the sole plate surface 45 is flush with surface 44, after the dam is removed. FIG. 2a shows such dam removal, and removal of excess braze 43, to provide the flush surface condition shown in FIG. 5, wherein the ledge is concealed.

Note that the shell thickness "t" encompassing the dam and ledge is considerably greater than the shell nominal thickness t' at its bottom wall, away from the ledge and dam.

It will be especially noted in FIG. 5, that the upper surface 26a of the ledge 26 forms an interengagement locus at 35 with the underside 36 of the sole plate periphery. That locus loops or extends all the way about the opening 21a bounded by the ledge, so as to block leakage of weld melt downwardly into the interior hollow of the shell, as during welding. The completed weld is indicated at 33a in FIG. 5. Downward force may be exerted on the sole plate, while the shell is supported, to ensure a good seal at 35, during welding.

I claim:

1. In the method of sustaining a metallic golf club head sole profile, the head having a bottom wall defining an opening with a peripheral and undercut ledge extending about said opening to support a sole plate received into said opening and on the ledge surface, the head defining a hollow shell, the steps that include (a) providing a dam on and integral with the head bottom wall and of the same metal as said wall extending about said opening and to project outwardly to substantially greater extent than the sole plate when the sole plate is supported on said ledge surface, (b) joining the sole plate to the head by producing a metallic melt in a peripheral space extending at and about the sole plate periphery with the melt in contact with the ledge surface and to a melt thickness at least as thick as the sole plate, and employing the dam to confine the melt at the side of the dam proximate the sole plate, and (c) thereafter removing the dam by abrading same to the common level of outer surfaces defined by the sole plate and head wall.

2. The method of claim 1 wherein the sole plate and head consist of different metals.

3. The method of one of claims 1 and 2 wherein the head consists of steel.

4. The method of one of claims 1 and 2 wherein the sole plate consists of brass.

5. The method of one of claims 1 and 2 wherein the head consists of steel and the sole plate consists of brass.

6. The method of claim 1 wherein the sole plate is provided with a thickness approximating that of the hollow head about the opening beyond the dam.

7. The method of claim 1 wherein said (c) step includes abrading solidified melt metal adjacent the dam.

8. The method of one of claims 1 and 7 wherein said melt is produced by introducing braze compound into proximity with the inner side of the dam, and melting said braze compound.

* * * * *